Patented Dec. 21, 1937

2,102,891

UNITED STATES PATENT OFFICE 2,102,891

MATERIAL FOR ARC WELDING

Lionel E. Faulkner, Hillside, N. J., assignor, by mesne assignments, to Air Reduction Company, Incorporated, a corporation of New York No Drawing. Application July 7, 1934, Serial No 734,207. Renewed June 5, 1937

7 Claims. (Cl. 219—8)

This invention relates to arc welding and provides a material particularly useful as a coating for weld rods of the heavily coated type for use in the shielded arc welding process.

One of the principal uses of the material is to form the desired slag to cover the molten weld metal and also to supply an ambient gaseous shield to exclude the oxygen and nitrogen in the air from contact with the molten metal in and near the arc, with which they tend readily to combine causing oxides and nitrides to be included in the weld which tend to weaken it. The material may be introduced in the vicinity of the arc in various ways but it is preferred to apply it to the metal weld rod as a coating or covering or to otherwise associate it with the rod in ways known in the art.

When the material is applied to the weld rod as a coating it is desirable that the coating shall be uniformly disintegrated by the heat of the arc so that the edges of the coating shall protrude beyond the end of the metal rod as it is fused, forming, as it were, a crucible from which the metal is projected onto the work. The material is therefore so constituted as to provide a coating which will act in the manner described. The protruding edges of the coating which form the crucible aid in excluding the air from the molten metal.

As the coating of a weld rod is disintegrated during the welding operation, the materials of which the coating is composed are either fused and deposited as slag or consumed, depending on their combustibility or, in some cases, alloyed or combined with the molten metal. As it is often desired to deposit only enough slag to effectively cover the weld and exclude the atmosphere, without any surplus to flow into the arc when doing vertical welding, or to drip off onto the operator when doing overhead welding, the invention also provides material for a coating constituted so as to give the proper shield, both as the crucible and by way of ambient gases, and at the same time the proper amount of slag. To this end both combustible and non-combustible materials may be included, the combustible material giving added bulk to the coating for the purpose of providing a shield without a corresponding increase in deposited slag. Various organic materials, for example cellulose or pitch, may be used as combustible material, being consumed at the temperature of the arc. In burning, moreover, they consume oxygen, tending to keep it away from the weld metal. They also produce an atmosphere of non-oxidizing or reducing gases, or both, around the arc which mechanically excludes the air. But other deoxidizers may be used, for example, ferro-manganese or aluminum.

It is important that the slag deposited on the weld shall have good covering power, that is to say, it should form a skin over the molten metal and not tend to break up into globules leaving parts of the surface exposed to the air. It should have such viscosity that it will not readily run, under the influence of gravity. The heat conductivity of the slag is such that it produces a desirable annealing of the deposited weld metal. It must also be of such specific gravity that when mixed in with the metal from the rod and the fused metal of the work, during the agitation caused by the arc, it will rise to the surface before the metal solidifies, thereby preventing the inclusion of slag in the weld metal. When so constituted it is possible to weld a second time over the same place without first removing the slag, as the latter will always rise to the surface.

When cold the slag should be easily removable. For this purpose, the coating ingredients are selected so as to produce a slag having a coefficient of expansion different from the metal it covers, giving it a tendency to crack or chip off by itself, requiring only a small amount of labor for complete removal such as brushing with a steel brush.

The invention provides a slag-forming and shield-producing material fulfilling the foregoing requirements and various embodiments of the invention will now be described in detail by way of illustration.

I have found that a slag-forming material which includes titanium dioxide ($TiO_2$), silicon dioxide ($SiO_2$) and magnesium oxide ($MgO$) as a basis, to which may be added suitable deoxidizing materials or organic materials or both, together with a binder, produces slag of the desired characteristics as set forth above. Extensive experiments have shown the effectiveness of these materials for the foregoing stated purposes.

The $TiO_2$, $SiO_2$ and $MgO$ may be varied in their relative proportions within rather extensive limits. Tests have shown very satisfactory results within the following ranges.

|  | Percent |
|---|---|
| $TiO_2$ | 17–78 |
| $SiO_2$ | 13–52 |
| $MgO$ | 8–33 |

It is not necessary to introduce these ingredients in the pure or uncombined state. The $TiO_2$ may be used in the form of rutile, or a titanate such as ilmenite ($FeTiO_3$), or a titanite such as sphene ($CaTiSiO_5$) or ferro-titanium. The $SiO_2$ is preferably introduced as silica but when sodium silicate is used as a binder it too will add to the available $SiO_2$. Silica is also frequently present in the other ingredients as an impurity. The MgO may be introduced in the form of calcined magnesite or as magnesium carbonate ($MgCO_3$).

I have also found that in place of MgO, compounds of aluminum or calcium may be used with equally good results, for example alumina ($Al_2O_3$), pyrophyllite ($H_2Al_2(SiO_3)_4$), magnesium carbonate ($MgCO_3$), calcium carbonate ($CaCO_3$), or calcium silicate ($CaSiO_3$). The carbonates decompose to form the corresponding metallic oxides with the production of non-oxidizing or reducing gases, for example $MgCO_3$ to form MgO and $CO_2$. Pyrophyllite is highly effective for use in electrode coating in combination with titanium dioxide and will take the place of both the silica and the magnesium oxide or alumina, for the reason that it is composed primarily of silica and alumina. Moreover, alumina and magnesium oxide are sufficiently similar in their characteristics so that they may be used interchangeably for the purposes of this invention.

It will be understood that as the titanium dioxide, silica, magnesium oxide or alumina may be introduced in other than their pure form, the materials used to introduce them may not be in the same relative proportions as the relative proportions of the three ingredients themselves. Moreover, one desired ingredient may be introduced in two or more substances or two ingredients may be introduced in one substance, as silica and alumina in pyrophyllite. But for convenience of definition, the percentage proportions of the ingredients in the coating are expressed as the relative amounts of the ingredients actually provided therein on the assumption that at welding temperatures the initial constituents are completely decomposed, as in the case of pyrophyllite, or oxidized as in the case of ferro-titanium.

It is to be further understood that in referring to proportions reference is made to the relative proportions of the ingredients specified, exclusive of other materials which may be added, such as combustible or deoxidizing materials and the like. It is entirely compatible with the present invention to add any material to the coating for special purposes as may be desired provided its nature and amount do not prevent the effectiveness of the coating for the intended results.

The following are typical formulae illustrating the use of my discoveries. They are designed to give a material of a consistency suitable for coating a weld rod either by dipping or by extrusion in the usual manner. Those formulae having an addition of water are suitable for dipping, the others for extrusion.

|  | Formulae | | |
|---|---|---|---|
|  | 1 | 2 | 3 |
| Rutile | 216 g. | 144 g. | 50 g. |
| Silica | 36 g. | 72 g. | 120 g. |
| Calcined magnesite | 24 g. | 48 g. | 100 g. |
| Sodium silicate | 35 c. c. | 46.5 c. c. | 46.5 c. c. |
| Water | 35 c. c. | 46.5 c. c. | 46.5 c. c. |

The sodium silicate solution acts as a binder and as used in these formulae was of 52° Bé., $Na_2O:SiO_2$ ratio 1:2.44. All dry materials were reduced to a finely powdered state before mixing. Other binders may be used, such as potassium silicate. In Formula 1 alumina may be substituted in the same proportion for the calcined magnesite with good results.

The following formula with magnesium carbonate has been successfully used:

Formula 4

| Rutile | 216 g. |
|---|---|
| Silica | 36 g. |
| Magnesium carbonate | 46 g. |
| Sodium silicate (as in Formula 1) | 68 c. c. |
| Water | 68 c. c. |

Deoxidizing material, such as ferro-manganese (FeMn) has been incorporated as shown by

Formula 5

| Rutile | 900 g. |
|---|---|
| Silica | 150 g. |
| Calcined magnesite | 100 g. |
| Ferro-manganese | 100 g. |
| Sodium silicate | 382 g. or 275 c. c. |

Sodium silicate as used in Formula 5 was 41° Bé., $Na_2O:SiO_2$ ratio 1:3.22. Ferro-titanium may be used as a deoxidant, supplying an additional amount of $TiO_2$, in which case the amount of rutile or other titanium-oxide material may be correspondingly reduced.

A typical formula using combustible material and a deoxidizing material is:

Formula 6

| Alpha cellulose (40 mesh) | 200 g. |
|---|---|
| Ferro-manganese | 80 g. |
| Titanium dioxide (pure) | 150 g. |
| Silica | 36 g. |
| Calcined magnesite | 24 g. |
| Sodium silicate (as in Formula 5) | 695 g. or 500 c. c. |

Pyrophyllite has been successfully used together with combustible and deoxidizing materials in the following,

Formula 7

| Alpha cellulose | 200 g. |
|---|---|
| Ferro-manganese | 40 g. |
| Titanium dioxide | 150 g. |
| Manganese dioxide | 30 g. |
| Pyrophyllite | 60 g. |
| Sodium silicate (as in Formula 5) | 450 c. c. |

Slag forming materials such as shown in Formulae 1, 2, 3 and 4 are suitable not only for coating mild steel weld rods but also work especially well on stainless steel weld rods such as steel having 18% chromium, 8% nickel content.

Other ingredients may be added to change the characteristics of the deposited metal such as vanadium, molybdenum, or manganese, either as the metals, alloys or their reducible compounds, without departing from the invention.

I have thus described my invention and illustrated it by various embodiments, not intending thereby to limit myself to the specific embodiments described, many modifications being contemplated within the purview of the following claims.

I claim:
1. An electrode for arc welding consisting of a metallic rod having a coating comprising a substance principally titanium dioxide and one or more substances which will provide in the coating silica and either alumina or magnesium oxide in such amounts as to give substantially the following proportions:

| | Percent |
|---|---|
| Titanium dioxide | 17–78 |
| Silica | 13–52 |
| Either alumina or magnesium oxide | 8–33 |

2. An electrode for arc welding consisting of a metallic rod having a coating comprising from 17% to 78% titanium dioxide, from 13% to 52% silica, and from 8% to 33% magnesium oxide.

3. An electrode for arc welding consisting of a metallic rod having a coating comprising from 17% to 78% titanium dioxide and from 22% to 83% pyrophyllite.

4. An electrode for arc welding consisting of a metallic rod having a coating comprising from 17% to 78% titanium dioxide, from 13% to 52% silica, and from 8% to 33% alumina.

5. An electrode for arc welding consisting of a metallic rod having a coating comprising from 17% to 78% titanium dioxide, from 13% to 52% silica and from 0% to 33% alumina and/or from 0% to 33% magnesium oxide, the total relative proportion of the last two ingredients being from 8% to 33%.

6. An electrode according to claim 5 in which pyrophyllite is substituted partially or wholly for the silica and alumina constituents and proportioned to the other ingredients relative to its content of silica and alumina within the specified limits.

7. A material for use on weld rods having substantially the following formula:

| | |
|---|---|
| Alpha cellulose | 200 g. |
| Ferro-manganese | 40 g. |
| Titanium dioxide | 150 g. |
| Manganese dioxide | 30 g. |
| Pyrophyllite | 60 g. |
| Sodium silicate | 450 c. c. |

LIONEL E. FAULKNER.